United States Patent [19]
Stoll et al.

[11] Patent Number: 6,053,414
[45] Date of Patent: Apr. 25, 2000

[54] DATA CARRIER CARD

[75] Inventors: Frank Stoll, München; Frank Pöhlau, Nürnberg, both of Germany

[73] Assignee: Siemens Aktiengesellschaft, Munich, Germany

[21] Appl. No.: 09/176,811

[22] Filed: Oct. 22, 1998

Related U.S. Application Data

[63] Continuation of application No. PCT/EP97/90138, Apr. 17, 1997.

[30] Foreign Application Priority Data

Apr. 22, 1996 [DE] Germany ............... 196 15 980

[51] Int. Cl.⁷ .............. G06K 19/06; H05K 1/14
[52] U.S. Cl. ........................... 235/492; 361/737
[58] Field of Search ................. 235/492, 441, 235/439, 451; 902/26; 361/737

[56] References Cited

U.S. PATENT DOCUMENTS

| | | | |
|---|---|---|---|
| 5,004,899 | 4/1991 | Ueda | 235/492 |
| 5,184,209 | 2/1993 | Kodai et al. | |
| 5,673,179 | 9/1997 | Horejs, Jr. et al. | 361/737 |
| 5,913,110 | 6/1999 | Herbst | 438/126 |

FOREIGN PATENT DOCUMENTS

| | | |
|---|---|---|
| 0350235A2 | 1/1990 | European Pat. Off. |
| 2595847 | 9/1987 | France. |
| 4218923A1 | 10/1992 | Germany. |
| 19504194C1 | 4/1996 | Germany. |

OTHER PUBLICATIONS

Japanese Patent Abstract No. 61139894 (Kenzo), dated Jun. 27, 1986.

*Primary Examiner*—Donald Hajec
*Assistant Examiner*—Daniel H. Sherr
*Attorney, Agent, or Firm*—Herbert L. Lerner; Laurence A. Greenberg; Werner H. Stemer

[57] ABSTRACT

The data carrier card has a card base structure formed with a recess in which one or more chips are disposed. The recess can be closed by a cover that is connected to the card base structure via a flexible area. The cap can thereby be pivoted relative to the base body of the card, with the flexible area acting as a hinge. The flexible region and the cover may either be construed in one piece with the card base structure, or the flexible area may be part of a label.

7 Claims, 2 Drawing Sheets

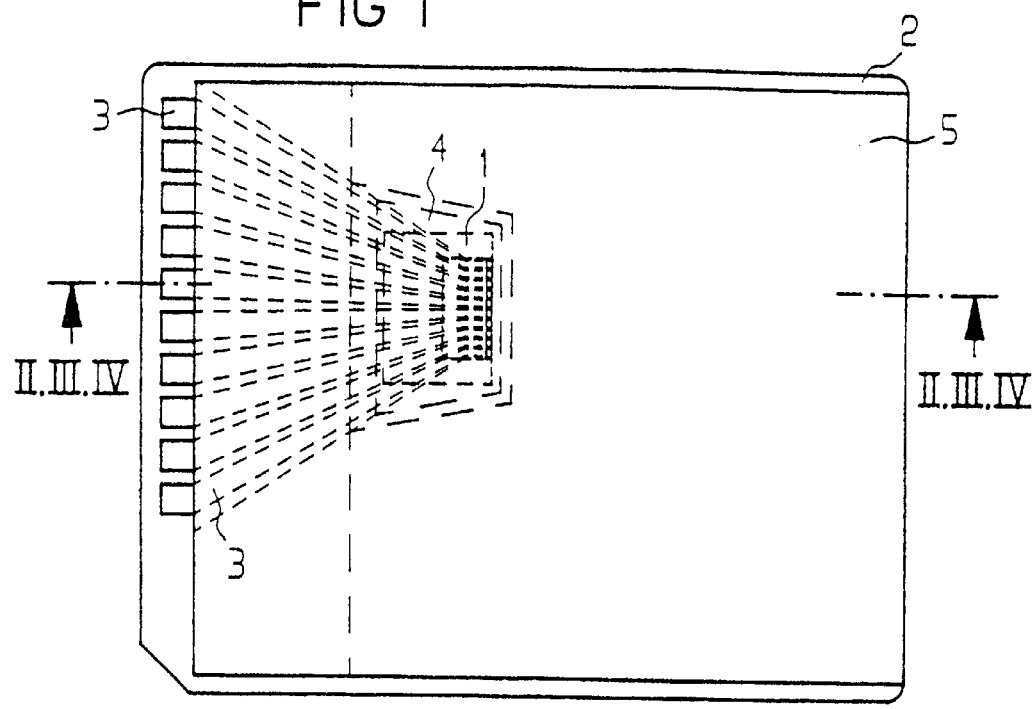
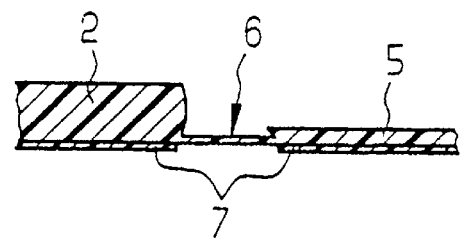
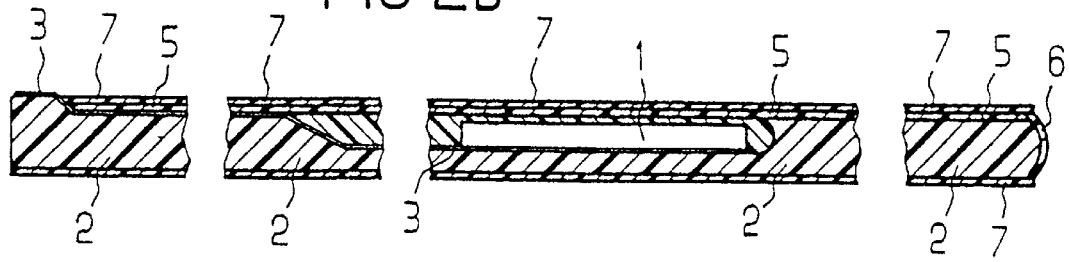

DATA CARRIER CARD

CROSS-REFERENCE TO RELATED APPLICATION

This is a continuation of copending International Application PCT/EP97/01938, filed Apr. 17, 1997, which designated the United States.

BACKGROUND OF THE INVENTION

Field of the Invention

The invention relates to a data carrier of plastic in card form, which can receive one or more chips in a recess which is closed with a cap. The chip or chips may be mounted on so-called MID conductor tracks by bare-chip mounting, potted with a plastic composition for instance, and then covered with a cap that covers at least the recess. In most cases the cap covers the entire flat side in which the recess is formed.

The term "MID technique" is understood to mean the formation of three-dimensionally extending conductor tracks, which are applied to a three-dimensional structured substrate (MID is an acronym for molded interconnect device, a three-dimensionally injection-molded circuit carrier)

Data carrier cards are often called chip cards, since as a rule a chip is included as a data memory or data processor.

Either a module comprising a small printed circuit board with chip mounted on it is inserted into a cutout of a base body of a data carrier card, or a chip mounted on a leadframe is spray-coated with plastic, or an MID substrate in card form is used, in which the chip is mounted, potted, and finally covered with a cap. Each of these cards may be provided over large surface areas with labels of any type. For data transmission to the outside or to the card, contacts need merely be kept free. On the other hand, contactless transmission is also possible in principle, via transmitting and receiving units.

Such cards can be provided with injection molded labels. For instance, various chip cards can be provided with labels in a single operation. For instance, plastic labels are held electrostatically in an injection mold, and after a module with electrical terminals that comprises a chip and circuit board is introduced, the plastic form can be injected, so that the chip module, terminals and labels are bonded to a card.

Such cards according to the prior art involve complicated and expensive assembly, however. With a chip pre-mounted on a substrate, insertion into the cards is a complicated process. Spray-coating a leadframe with plastic is also very expensive in terms of systems technology, because the pre-mounted leadframe has to be manipulated in the injection molding machine. This is particularly true since the chip must be protected beforehand against damage, in a separate work step, for instance by being sheathed with a plastic composition. Thus injection molding processes are disadvantageous not only because of the relatively high temperature stress for semiconductor components, but also because very expensive systems are needed. The injection molding process, which is associated with straightening two labels and the module inside the injection mold, is very vulnerable to error. It is essential that this step be taken at the end of the value addition chain, with the chip already installed. If there is a flaw in the relatively inexpensive plastic part, the expensive chip together with the entire card thus becomes a reject.

A further development in the prior is a data carrier card with an MID card body. The chip is inserted into the base body of the card here nearly at the end of the value addition chain.

Next, on the side where the chip has been inserted into a recess, a cap is applied. The flat sides of the card can be finished by imprinting or by attaching labels. The chip is thus no longer exposed to the thermal stress of an injection molding process.

Since the known data carrier cards or chip cards are produced in very large numbers, the prior art production methods include further disadvantages. For instance, at least the base body of the card, chip, cap and label as well as adhesive must be delivered to the production process.

SUMMARY OF THE INVENTION

It is accordingly an object of the invention to provide a data carrier card, which overcomes the disadvantages of the heretofore-known devices and methods of this general type and which is simple to assemble and substantially improves or simplifies both logistics and handling on the assembly line.

With the foregoing and other objects in view there is provided, in accordance with the invention, a data carrier card, comprising:

a base body formed with a recess for receiving at least one chip;

a cap for closing off the recess, the cap having a smaller thickness than the base body; and a flexible region connecting the cap to the base body, such that the cap is pivotable relative to the base body from an open position to a closed position in which the cap closes off the recess.

In accordance with an added feature of the invention, the flexible region and the cap are integrally formed with the base body.

In accordance with another feature of the invention, the assembly is provided with a label on the flat side of the base body opposite a side thereof in which the recess is formed, and the flexible region forms an integral part of the label.

The invention is based on the recognition that essential logistical and process simplifications are attainable with a prefabricated one-piece sandwich comprising the basic card body, cap, and an intervening flexible zone of the same material, used for hinging the cap. Thus the data carrier card, which has a recess, can be provided with one or more chips and then closed with a cap that is formed in one piece with the basic card body, by folding over the cap via an intervening flexible region that forms a hinge and by securing it onto the recess on the flat side of the base body of the card.

The proposed one-piece base body of the card with the cap simultaneously formed on it makes it unnecessary, compared with a base body of the card previously made by the MID technique, to furnish two separate parts, that is, the basic card body and the cap. Thus both furnishing and stockkeeping of semifinished products or intermediate products is made simpler, and simplifications are obtained within the assembly line in terms of handling, for instance in the form of positioning operations that are no longer necessary.

In accordance with an additional feature of the invention, the flexible region, the cap, and the base body are injection molded. In other words, the cap intended to fold over and cover the chips in the recess of the base body of the card can be provided on the preliminary product by injection molding, as noted above. Once the data carrier cards have been almost completely imprinted or in some other way provided with labels, the hinge for hinging over the cap can also comprise a label. In that case, the label would cover the flat side opposite the recess of the base body of the card and protrude to the side; it would act as the flexible region required for hinging over the cap and would also would carry the cap per se. The spacing between the cap and the base body of the card is approximately equivalent to the thickness of the basic card body on its narrow side, so that on being hinged over via the flexible region of the label, the cap is positioned precisely on the one flat side of the base body of the card having the recess and can be adhesively bonded, while the flexible region of the label presses against the narrow side of the basic card body.

In accordance with again another feature of the invention, the cap and the flexible region form integral parts of the label.

The third possible embodiment thus uses a reinforced label. Once again, it covers the base body of the card on one side and protrudes past the base body of the card on the short side, forms a flexible region, and adjoining the flexible region forms the cap. Thus in the semifinished product the cap is not separately applied to the label and folded over with this label but instead is embodied by the label itself, which is reinforced for the purpose. This reinforcement nevertheless makes it possible to embody a flexible region, which when the cap is folded over presses against the short side of the base body of the card. In this respect it is conceivable for the flexible region to be thinner than the region of the label that acts as the cap.

To produce a base body of the card according to the invention that is embodied in one piece or integrally with a cap that does not yet close the base body of the card, injection molding processes are advantageously employed.

In accordance with a concomitant feature of the invention, the cap is adapted to be glued or welded to the base body for closing off the recess.

Within the value addition chain, in order to shift the biggest step to the end of the process chain, inscriptions or labels with suitable graphics may already be present on the intermediate product or semifinished product. Thus imprinting, which involves heat stress, chemical stress and possibly compressive stress, is thus unnecessary once the chip has been mounted and covered with the cap. Once the card has been covered with the cap, it is ready for shipping. In principle, however, labeling or imprinting can also be done after the chip is mounted in the recess of the base body of the card and after the cap has been closed.

A data carrier card produced by the method described thus, in the finished state covered with the cap, has a connection between the cap and the side opposite the cap that rests on the corresponding short side of the data carrier card or basic card body. This is the flexible region of the intermediate product, which acts as a hinge as the cap is folded over. It is either formed by the same plastic material as the base body of the card and the cap and integrated embodied with them, or is formed by a corresponding label.

To enable furnishing a finished base body of the card with an attached cap for chip assembly as inexpensively as possible, this plastic body may be provided with a label that is applied during the injection molding process or introduced into the injection molding tool. In the injection molding operation, the label bonds to the basic card body, which in an ensuing operation can be provided with three-dimensionally embodied conductor tracks (this is known as the in-mold process). Thus an MID base body of the card with an integrated inscription can be produced and delivered to the final production process for the data carrier card. Compared with the prior art, this economizes by dispensing with the later imprinting or labeling on at least one side of the card.

Other features which are considered as characteristic for the invention are set forth in the appended claims.

Although the invention is illustrated and described herein as embodied in a data carrier card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic plan view onto a data carrier card covered with a cap, with the chip and the conductor tracks shown in dashed lines because for the most part they are not visible in the finished state;

FIG. 2a is a partial sectional view, generally taken along the line II—II in FIG. 1, of an integrally embodied semi-finished product prior to the mounting of the chip;

FIG. 2b is a broken sectional view, generally taken along the line II—II in FIG. 1, of a data carrier card with a mounted chip and an adhesively bonded folded-over cap;

DESCRIPTION OF THE PREFERRED EMBODIMENTS

Figure 3A:
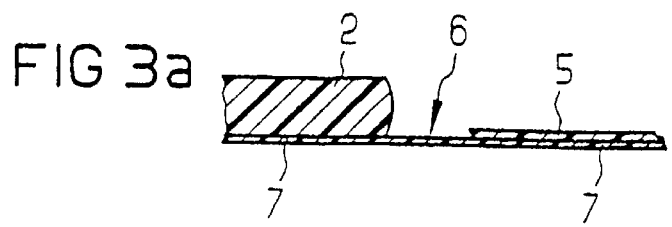
FIG. 3a is a partial sectional view, generally taken along the line III—III in FIG. 1, of a connection between the base body of the card and the cap via a label, in the form of a semi-finished product.

Referring now to the figures of the drawing in detail and first, particularly, to FIG. 1 thereof, there is seen a data carrier card with a chip 1 mounted in a recess or indentation 4. Conductor tracks 3 have been made three-dimensionally on the surfaces of the base body of the card by MID technology. A base body 2 of the card has been covered, on the side of the indentation 4, with a cap 5. The three-dimensional course of the conductor tracks 3, which have been applied to the plastic base body 2 of the card by electroplating, will become more clearly apparent from the drawing figures to be described in the following.

FIGS. 2a and 2b show the semifinished product or intermediate product in the hinged-open state (FIG. 2a) and the hinged-closed state (FIG. 2b). The base body 2 of the card has been made integrally with the cap 5 at the same time in an injection molding operation. The cap 5 is spaced apart from a short side of the base body 2 of the card via a flexible region 6. The flexible region 6 acts as a hinge and has a lesser thickness than the cap 5. FIG. 2b shows the course of the conductor tracks 3 in section, making the three-dimensional embodiment clear. The chip 1 has been mounted in the indentation 4 on the conductor tracks 3 and covered with a plastic composition. The cap 5 has been mounted over it, that is, as a rule, glued on. The flexible region 6 in this state rests on the short side of the base body 2 of the card and contains to act as a separate connection between the base body 2 of the card and the cap 5.

Figure 3B:
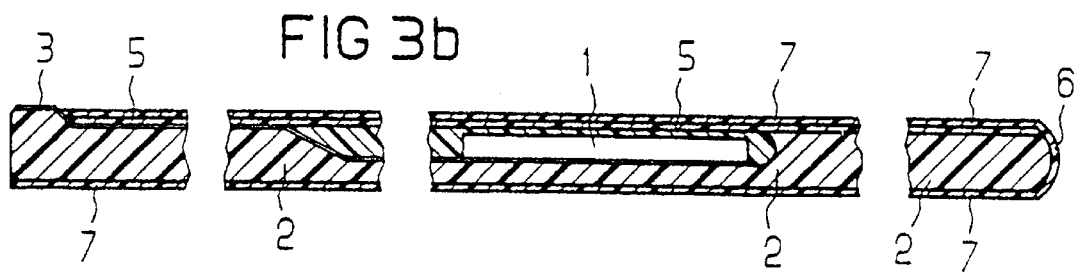
FIG. 3b is a broken sectional view, generally taken along the line III—III in FIG. 1, of the embodiment of FIG. 3a in the finally assembled and cap-covered state.

FIGS. 3a and 3b show the state with a hinged-open cap and the state with a hinged-closed cap, respectively. In FIG. 3a, a semifinished or intermediate product furnished for final assembly is shown; it is embodied as a one-piece part. In it, a label 7 is joined on one side to the base body 2 of the card and on the other to the cap 5. The latter two parts are spaced apart from one another. The spaced-apart region is spanned by a part (as a rule, a riblike part) of the label 7 that serves as a flexible hinge to assure the folding over of the cap 5, so that the state shown in FIG. 3b can be brought about. In FIG. 3b, the chip 1, conductor tracks 3, base body 2 of the card, label 7, and flexible region 6 are again shown. It can be seen that the cap 5 covers most of the broad top side of the base body 2 of the card, which has the indentation 4. Only at the left upper edge is there a region at which the terminal parts of the conductor tracks 3 are extended to the outside and are bare, acting as contacts for data transmission. In principle, these contacts may also be embodied on the short sides of the base body 2 of the card or may for instance be in the form of a U embracing it.

Figure 4A:
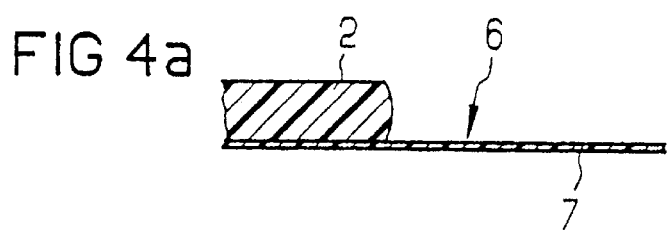
FIG. 4a is a partial sectional view, generally taken along the line IV—IV in FIG. 1, of a semi-finished further embodiment.
Figure 4B:
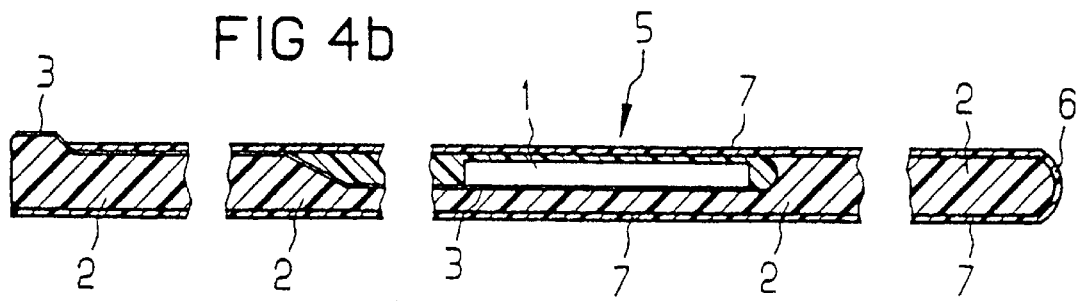
FIG. 4b is a broken sectional view, taken along the line IV—IV in FIG. 1, of a data carrier card finally equipped with a chip, with the cap being formed by the label.

FIGS. 4a and 4b show another variant embodiment of the invention. In this case, the label is reinforced, so that there is no need to apply a separate cap. The label 7 acts as the cap 5. The length of the label 7, shown in section in FIG. 4a and protruding past the edge of the base body 2 of the card, is dimensioned such that once again the size of the cap 5 and of the necessary flexible region 6 are present. Once the label 7 acting as the cap 5 has been folded over, as shown in FIG. 4b the data carrier card or the indentation 4 is now covered with the chip 5, and the flexible region 6 rests on the short side of the base body 2 of the card.

By the so-called in-mold process, labels with a thickness of about 0.1 mm, for instance, can be applied to plastic bodies by an injection molding process. The two parts, that is, the base body 2 of the card and the cap 5, can be joined as shown in the drawings via a filmlike hinge, that is, the flexible region 6, or by means of a label that substantially covers both large-area sides of the data carrier card.

The substantial advantage of the invention is that it furnishes a fully prepared base body 2 of the card that is joined integrally or in one piece to the cap. If all the imprints are already present, then further substantial advantages in final assembly are obtained. The chip need merely be mounted and the cap closed for a finished, assembled data carrier card or chip card to be present.

One advantage of the invention shown in FIGS. 4a and 4b is that no injection molding region for the cap is necessary in producing the semifinished product. For the data carrier card created by the end of the entire process, it is true that a greater proportion of the available total card thickness of the base body 2 of the card, which acts as the basic card body 3, can be made available. Thus the entire card can be embodied rigidly. On the other hand, if less rigidity is demanded, the card can be thinner. Since very thin regions are present above and below the chip, the embodiment of FIGS. 4a and 4b makes the injection molding easier and less expensive. In this version, a somewhat thicker label is preferably used, one that is for instance 0.2 mm thick, so as to assure an adequate thickness for the protective function in the region of the chip.

The cap 5 may be secured to the base body 2 of the card by ultrasonic or laser welding, for instance. If imprinting after chip mounting is intended, then the surfaces as a rule remain white. The usually riblike flexible region 6 need not be made continuous over the entire length of the short side of the base body 2 of the card. A version with a plurality of connecting tabs is also practicable. In that case, recesses are located between the tabs. Contacts can for instance be accommodated on these recesses positioned on the short sides.

We claim:

1. A data carrier card, comprising:
    a base body formed with a recess for receiving at least one chip;
    a cap for closing off said recess permanently after completion of assembly of the card, said cap having a smaller thickness than said base body; and
    a flexible region connecting said cap to said base body, such that said cap is pivotable relative to said base body from an open position to a closed position in which said cap closes off said recess.

2. The data carrier card according to claim 1, wherein said flexible region and said cap are integrally formed with said base body.

3. The data carrier card according to claim 2, wherein said flexible region, said cap, and said base body are injection molded.

4. The data carrier card according to claim 1, wherein said base body has a flat side opposite a side thereof in which said recess is formed, and including a label disposed on said flat side and said cap, said flexible region being a part of said label.

5. The data carrier card according to claim 1, wherein said base body has a flat side opposite a side thereof in which said recess is formed, and including a label disposed on said flat side, said cap and said flexible region forming integral parts of said label.

6. The data carrier card according to claim 1, wherein said cap is adapted to be glued to said base body for closing off said recess.

7. The data carrier card according to claim 1, wherein said cap is adapted to be welded to said base body for closing off said recess.

* * * * *